United States Patent
Aluru et al.

(10) Patent No.: US 11,805,329 B1
(45) Date of Patent: Oct. 31, 2023

(54) SYSTEM AND METHOD FOR DISCHARGING IMAGE SENSOR CAPACITORS

(71) Applicant: GM GLOBAL TECHNOLOGY OPERATIONS LLC, Detroit, MI (US)

(72) Inventors: Sai Vishnu Aluru, Commerce Township, MI (US); Sravan Daruri, Walled Lake, MI (US); Brian Yousif-Dickow, Farmington Hills, MI (US); Andrew W Averhart, Redford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/812,166

(22) Filed: Jul. 12, 2022

(51) Int. Cl.
*H04N 25/50* (2023.01)
*H04N 17/00* (2006.01)
*G06T 5/00* (2006.01)
*G06T 7/00* (2017.01)
*G01J 1/46* (2006.01)

(52) U.S. Cl.
CPC ............... *H04N 25/50* (2023.01); *G01J 1/46* (2013.01); *G06T 5/009* (2013.01); *G06T 7/0002* (2013.01); *H04N 17/002* (2013.01); *G06T 2207/30168* (2013.01); *G06T 2207/30252* (2013.01)

(58) Field of Classification Search
CPC ......... H04N 25/50; H04N 17/002; G01J 1/46; G06T 5/009; G06T 7/0002; G06T 2207/30168; G06T 2207/30252
See application file for complete search history.

(56) References Cited

U.S. PATENT DOCUMENTS

2008/0112651 A1* 5/2008 Cho ..................... H04N 25/533
348/E3.018

* cited by examiner

Primary Examiner — Thanh Luu
Assistant Examiner — Monica T Taba
(74) Attorney, Agent, or Firm — Lorenz & Kopf LLP

(57) ABSTRACT

Systems, methods, and apparatus are provided for real-time adjustment of image quality parameters. The system includes a controller configured to: acquire an image frame, having a fixed-pixel region that defines a region-of-interest, from one or more imaging devices; apply image processing techniques to determine a modified fixed-pixel region that excludes non-relevant object pixels; alter one or more image quality parameters based on statistics of pixels in the modified fixed-pixel region; and provide the altered one or more image quality parameters to the one or more imaging devices for use with subsequent image frames; wherein the one or more imaging devices produce an image that is tuned, based on the altered one or more image quality parameters, to the portions of the image in the region-of-interest that does not include the non-relevant object pixels.

20 Claims, 3 Drawing Sheets

SYSTEM AND METHOD FOR DISCHARGING IMAGE SENSOR CAPACITORS

INTRODUCTION

The technical field generally relates to systems, methods, and apparatuses for imaging systems and more particularly relates to systems, methods, and apparatuses for protecting imaging systems.

With the implementation of LIDAR and other active safety technologies, there are many high amplitude/intensity lasers/signals being emitted continuously from vehicles. Despite being eye safe, and safe to humans, when cameras are exposed directly to the high intensity signals, the photodiodes on sensor are at risk of over-charging, which can result in burnt-out pixels in an imager. As the many high amplitude/intensity lasers/signals continue to occur over time, optical camera performance and well-being can degrade over time and may lead to other vehicle problems.

It is therefore desirable for improved methods, systems, and apparatuses for providing protections against harm that can occur from continuous exposure to high amplitude/intensity lasers/signals. Furthermore, other desirable features and characteristics of the present disclosure will become apparent from the subsequent detailed description and the appended claims, taken in conjunction with the accompanying drawings and the foregoing technical field and background.

The information disclosed in this introduction is only for enhancement of understanding of the background of the present disclosure and therefore it may contain information that does not form the prior art that is already known in this country to a person of ordinary skill in the art.

SUMMARY

Disclosed herein are methods, systems, and related control logic for discharging image sensor capacitors. The disclosed methods, systems, and related control logic can be applied to vehicle cameras, vehicle systems, motor vehicles, vehicle image sensors and other cameras and image sensors that are not associated with motor vehicles.

In one embodiment, an image sensor capacitor discharge system is disclosed. The system includes a controller. The controller is configured to: acquire a frame of image data for analysis from one or more imaging devices; determine a signal level (e.g., luminance) variance amongst pixels in the frame by applying image processing techniques; determine a saturation level of tones in the pixels by applying image processing techniques; when the signal level variance is sufficiently high and the saturation level of tones is sufficiently high, identify image sensor capacitors for discharge; and send a capacitor discharge signal to an image sensor to discharge the identified image sensor capacitors; wherein the identified image sensor capacitors are discharged to avoid image sensor burnout.

In various embodiments of the system, to determine a signal level variance amongst the pixels, the controller is configured to: segment a received image frame into separate bit planes and monitor one or more bit planes for bit stability.

In various embodiments of the system, to determine a signal level variance amongst the pixels, the controller is further configured to determine a luminance level, noise level, and signal-to-noise ratio for pixels.

In various embodiments of the system, to determine a signal level variance amongst the pixels, the controller is further configured to calculate a standard deviation of signal level variation amongst the pixels based on the bit stability for a bit plane and the luminance level, noise level, and signal-to-noise ratio for pixels.

In various embodiments of the system, to determine a signal level variance amongst the pixels, the controller is further configured to assign an index to each separate bit plane and apply the index value to match the luminance level, noise level, and signal-to-noise ratio for pixels to output from monitoring one or more bit planes for bit stability when calculating a standard deviation.

In various embodiments of the system, to determine a signal level variance amongst the pixels, the controller is configured to: segment a received image frame into separate bit planes; monitor one or more bit planes for bit stability; determine a luminance level, noise level, and signal-to-noise ratio for pixels; and calculate a standard deviation of signal level variation amongst the pixels based on the bit stability for a bit plane and the luminance level, noise level, and signal-to-noise ratio for pixels.

In various embodiments of the system, the controller is further configured to determine whether the standard deviation of signal level variation amongst the pixels is non-zero.

In various embodiments of the system, when the standard deviation of signal level variation amongst the pixels is non-zero, the signal level variance is sufficiently high.

In various embodiments of the system, the controller is configured to determine a saturation level of tones in the pixels by performing tone mapping and gamma correction operations.

In various embodiments of the system, the saturation level of tones is sufficiently high when the tones are saturated.

In another embodiment, a method for discharging image sensor capacitors is disclosed. The method includes: acquiring a frame of image data for analysis from one or more imaging devices; determining a signal level (e.g., luminance) variance amongst the pixels using image processing techniques; determining a saturation level of tones in the pixels using image processing techniques; identifying image sensor capacitors for discharge when the signal level variance is sufficiently high and the saturation level of tones is sufficiently high; and sending a capacitor discharge signal to an image sensor to discharge the identified image sensor capacitors when image sensor capacitors are identified; wherein the identified image sensor capacitors are discharged to avoid image sensor burnout.

In various embodiments of the method, determining a signal level variance amongst the pixels includes segmenting a received image frame into separate bit planes and monitoring one or more bit planes for bit stability.

In various embodiments of the method, determining a signal level variance amongst the pixels includes determining a luminance level, noise level, and signal-to-noise ratio for pixels.

In various embodiments of the method, determining a signal level variance amongst the pixels includes calculating a standard deviation of signal level variation amongst the pixels based on the bit stability for each bit plane and the luminance level, noise level, and signal-to-noise ratio for each pixel.

In various embodiments of the method, determining a signal level variance amongst the pixels includes assigning an index to each separate bit plane and matching the luminance level, noise level, and signal-to-noise ratio for pixels to output from monitoring one or more bit planes for bit stability based on applying the index value when calculating a standard deviation.

In various embodiments, the method further includes determining whether the standard deviation of signal level variation amongst the pixels is non-zero.

In various embodiments of the method, when the standard deviation of signal level variation amongst the pixels is non-zero, the signal level variance is sufficiently high.

In various embodiments, the method further includes determining a saturation level of tones in the pixels based on performing tone mapping and gamma correction operations.

In various embodiments of the method, the saturation level of tones is sufficiently high when the tones are saturated.

In another embodiment, a vehicle includes one or more imaging devices and a controller. The controller is configured to: acquire a frame of image data for analysis from the one or more imaging devices; to determine a signal level (e.g., luminance) variance amongst the pixels in the frame by applying image processing techniques; determine a saturation level of tones in the pixels by applying image processing techniques; when the signal level variance is sufficiently high and the saturation level of tones is sufficiently high, identify image sensor capacitors for discharge; and send a capacitor discharge signal to an image sensor to discharge the identified image sensor capacitors; wherein the identified image sensor capacitors are discharged to avoid image sensor burnout.

In various embodiments of the vehicle, to determine a signal level variance amongst the pixels, the controller is configured to: segment a received image frame into separate bit planes; monitor one or more bit planes for bit stability; determine a luminance level, noise level, and signal-to-noise ratio for pixels; and calculate a standard deviation of signal level variation amongst the pixels based on the bit stability for a bit plane and the luminance level, noise level, and signal-to-noise ratio for pixels.

In various embodiments of the vehicle, to determine a signal level variance amongst the pixels, the controller is configured to: segment a received image frame into separate bit planes and monitor one or more bit planes for bit stability.

In various embodiments of the vehicle, to determine a signal level variance amongst the pixels, the controller is further configured to determine a luminance level, noise level, and signal-to-noise ratio for pixels.

In various embodiments of the vehicle, to determine a signal level variance amongst the pixels, the controller is further configured to calculate a standard deviation of signal level variation amongst the pixels based on the bit stability for a bit plane and the luminance level, noise level, and signal-to-noise ratio for pixels.

In various embodiments of the vehicle, to determine a signal level variance amongst the pixels, the controller is further configured to assign an index to each separate bit plane and apply the index value to match the luminance level, noise level, and signal-to-noise ratio for pixels to output from monitoring one or more bit planes for bit stability when calculating a standard deviation.

In various embodiments of the vehicle, the controller is further configured to determine whether the standard deviation of signal level variation amongst the pixels is non-zero.

In various embodiments of the vehicle, when the standard deviation of signal level variation amongst the pixels is non-zero, the signal level variance is sufficiently high.

In various embodiments of the vehicle, the controller is configured to determine a saturation level of tones in the pixels by performing tone mapping and gamma correction operations.

In various embodiments of the vehicle, the saturation level of tones is sufficiently high when the tones are saturated.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In various embodiments, apparatus, systems, techniques, and articles disclosed herein can perform automated analysis on images to identify oversaturated pixels and perform active reduction of photodiode capacitance inside image sensors to protect the pixels from being over-charged and burned out by discharging the capacitance of the photodiodes. This discharging can prepare the photodiodes for an unexpected instantaneous charge from incoming high intensity/amplitude signals thus preventing damage to the photodiodes and the imager.

Figure 1:
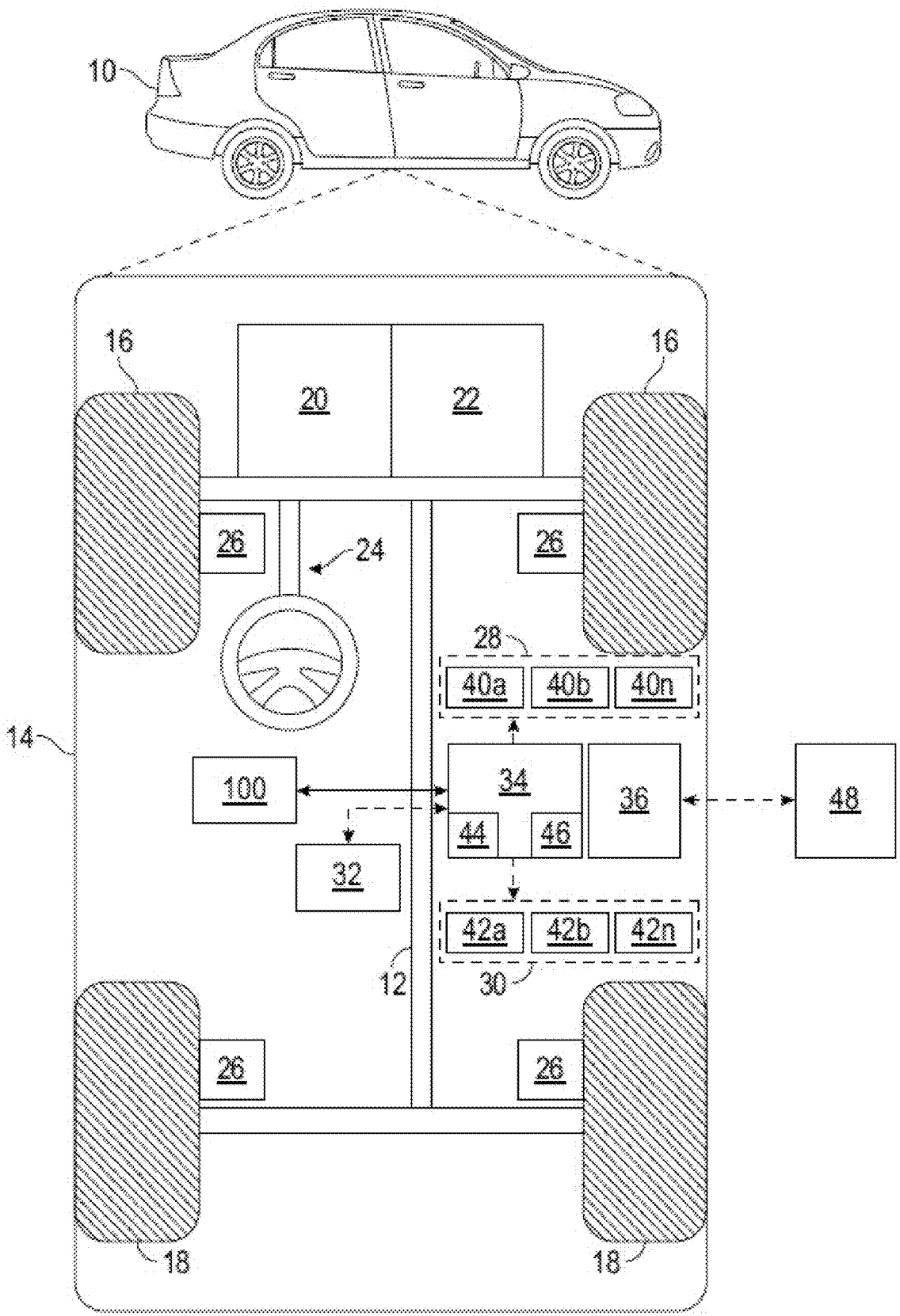
FIG. 1 is a block diagram depicting an example vehicle that includes an image sensor capacitor discharge system for real-time discharge of image sensor capacitors to prevent sensor burnout of optical sensors in optical cameras on the vehicle, in accordance with an embodiment.

FIG. 1 is a block diagram depicting an example vehicle 10 that includes an image sensor capacitor discharge system 100 for real-time discharge of image sensor capacitors to prevent sensor burnout of optical sensors in optical cameras on the vehicle. As depicted in FIG. 1, the example vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 is depicted in the illustrated embodiment as a passenger car, but other vehicle types, including trucks, sport utility vehicles (SUVs), recreational vehicles (RVs), etc., may also be used. The vehicle 10 may be capable of being driven manually, autonomously and/or semi-autonomously.

The vehicle 10 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, and a communication system 36 that is configured to wirelessly communicate information to and from other entities 48.

The sensor system 28 includes one or more sensing devices 40a-40n that sense observable conditions of the exterior environment and/or the interior environment of the autonomous vehicle 10. The sensing devices 40a-40n can include but are not limited to, radars, lidars, global positioning systems, optical cameras, thermal cameras, ultrasonic sensors, inertial measurement units, Ultra-Wideband sensors, and/or other sensors. The actuator system 30 includes one or more actuator devices 42a-42n that control one or more vehicle features such as, but not limited to, the propulsion system 20, the transmission system 22, the steering system 24, and the brake system 26.

The data storage device 32 stores data for use in automatically controlling the vehicle 10. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34.

The programming instructions may include one or more separate programs, each of which comprises an ordered listing of executable instructions for implementing logical functions. The one or more instructions of the controller 34, when executed by the processor 44, may configure the vehicle 10 to implement the image sensor capacitor discharge system 100 to perform real-time discharge of image sensor capacitors to prevent sensor burnout of optical sensors in optical cameras on the vehicle.

Additionally, inputs to the image sensor capacitor discharge system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
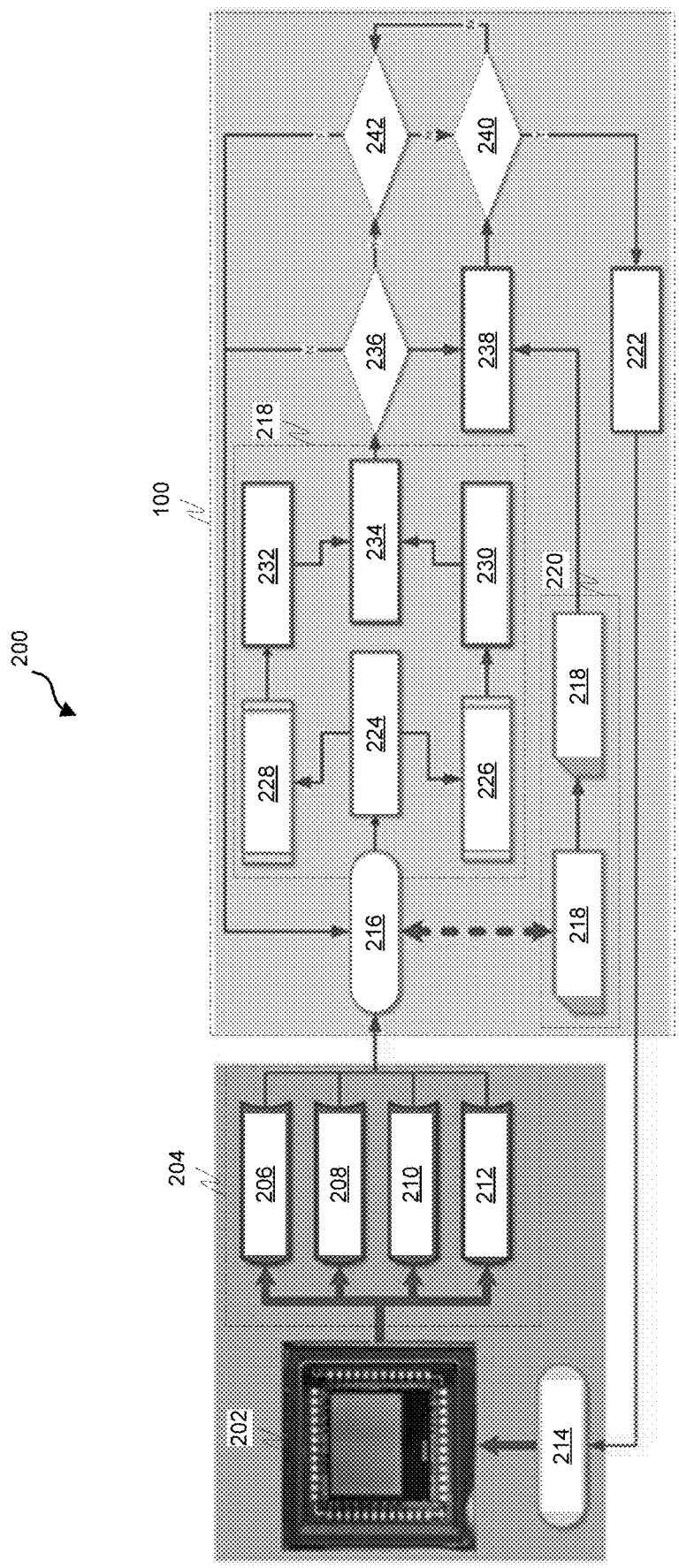
FIG. 2 is a block diagram illustrating an example system that implements an example image sensor capacitor discharge system for real-time discharge of image sensor capacitors to prevent sensor burnout of one or more optical image sensors in optical cameras on a vehicle, in accordance with an embodiment.

FIG. 2 is a block diagram illustrating an example system 200 that implements an example image sensor capacitor discharge system 100 for real-time discharge of image sensor capacitors to prevent sensor burnout of one or more optical image sensors 202 in optical cameras on a vehicle. The one or more image sensors 202 generate a plurality of varying exposure elements 204 that are combined to generate an image frame. The plurality of varying exposure elements 204 that may be combine to generate an image frame include a combination of varying numbers of very short exposure elements 206, short exposure elements 208, long exposure elements 210, and very long exposure elements 212.

The example image sensor capacitor discharge system 100 is configured to analyze frames of image data formed from the varying numbers of very short exposure elements 206, short exposure elements 208, long exposure elements 210, and very long exposure elements 212 from the one or more image sensors 202 and determine if conditions exist that warrant signaling an image sensor 202 with a capacitor discharge signal 214 to discharge image sensor capacitors.

A controller in a vehicle (e.g., vehicle 10) that implements an example image sensor capacitor discharge system 100 obtains a frame of image data for analysis (operation 216), determines the signal level (e.g., luminance) variance amongst the pixels (operation 218), and determines the saturation level of tones in the pixels (operation 220). If both the signal level variance is sufficiently high and there is sufficient tone saturation, the controller performs low frequency (LFR)/modulation analysis (operation 222) to identify image sensor capacitors about which to signal an image sensor 202 with a capacitor discharge signal 214 to discharge.

To determine the signal level variance amongst the pixels, the example image sensor capacitor discharge system 100 is configured to segment a received image frame (operation 224) into separate bit planes 226 and to assign an index 228 to each separate bit plane. For example, if the image frame is a greyscale image frame, the image frame may be separated into 8 bit planes, one bit frame for each bit that makes up a pixel in the image frame, wherein a bit plane of a digital discrete signal (such as image) is a set of bits corresponding to a given bit position in each of the binary numbers representing the signal. The example image sensor capacitor discharge system 100 is further configured to monitor each bit plane for bit stability (operation 230) and to determine the luminance level, noise level, and signal-to-noise ratio for each pixel (operation 232). Based on the bit stability for each bit plane and the luminance level, noise level, and signal-to-noise ratio for each pixel, the example image sensor capacitor discharge system 100 determines the signal level (e.g., luminance) variance amongst the pixels by calculating a standard deviation of signal level variation amongst the pixels (operation 234). The example image sensor capacitor discharge system 100 may use the index value to match the luminance level, noise level, and signal-to-noise ratio for pixels resulting from operation 232 to the bit stability analysis resulting from operation 230 when calculating a standard deviation at operation 234.

The example image sensor capacitor discharge system 100 determines whether the standard deviation of signal level variation amongst the pixels is non-zero (decision 236). If the standard deviation of signal level variation amongst the pixels is zero (no at decision 236), then a capacitor discharge signal 214 to discharge image sensor capacitors is not needed and the example image sensor capacitor discharge system 100 analyzes the next frame of image data. If the standard deviation of signal level variation amongst the pixels is non-zero (yes at decision 236), then saturation of tones analysis (operation 238) is performed.

The saturation level of tones in the pixels can be determined by performing tone mapping (operation 218) and gamma correction (operation 220). As is known in the art, tone mapping is a technique used in image processing and computer graphics to map one set of colors to another to approximate the appearance of high-dynamic-range images in a medium that has a more limited dynamic range. The tone mapping can be calibratable. Also as is known in the art, gamma correction or gamma is a nonlinear operation used to encode and decode luminance or tristimulus values in video or still image systems. Based on the tone mapping and gamma correction, the example image sensor capacitor discharge system 100 determines the saturation level of tones in pixels (operation 238).

The example image sensor capacitor discharge system 100 determines whether tones in the pixel are saturated (decision 240). If tones are not saturated (no at decision 240), then a capacitor discharge signal 214 to discharge image sensor capacitors is not needed and the example image sensor capacitor discharge system 100 analyzes the next frame of image data. If tones are saturated (yes at decision 236) and because it was also determined that the standard deviation of signal level variation amongst the pixels is non-zero, then LFR/modulation analysis (operation 222) is performed. The LFR/modulation analysis is an identification method of potential flicker in the real light source which helps in (operation 222) identification of need for image sensor capacitor's discharge. The example image sensor capacitor discharge system 100 may signal an image sensor 202 with a capacitor discharge signal 214 that identifies the image sensor capacitors to discharge.

The example image sensor capacitor discharge system 100 may implement a frame counter to correlate output from the saturation level of tones analysis at operation 238 with output from the standard deviation decision at decision 236. Based on a frame counter increment determination (decision 242), LFR/Modulation analysis (operation 222) is performed when the frame for which it was determined that the tones were saturated matches the frame for which it was determined that the standard deviation was non-zero.

Figure 3:
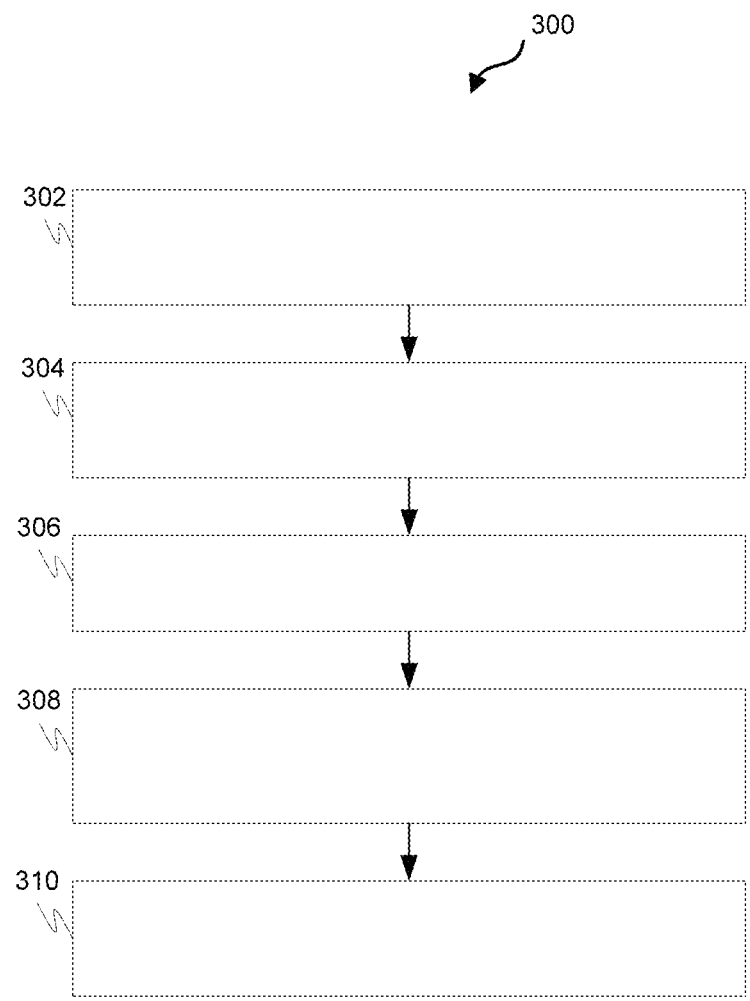
FIG. 3 is a process flow chart depicting an example process for discharging image sensor capacitors, in accordance with an embodiment.

FIG. 3 is a process flow chart depicting an example process 300 for discharging image sensor capacitors. The order of operation within process 300 is not limited to the sequential execution as illustrated in the FIG. 3 but may be performed in one or more varying orders as applicable and in accordance with the present disclosure.

The example process 300 includes acquiring a frame of image data for analysis from one or more imaging devices (operation 302) and determining a signal level (e.g., luminance) variance amongst the pixels using image processing techniques (operation 304). Determining a signal level variance amongst the pixels may include segmenting a received image frame into separate bit planes, monitoring one or more bit planes for bit stability, determining a luminance level, noise level, and signal-to-noise ratio for pixels, and calculating a standard deviation of signal level variation amongst the pixels based on the bit stability for each bit plane and the luminance level, noise level, and signal-to-noise ratio for each pixel.

The example process 300 includes determining a saturation level of tones in the pixels using image processing techniques (operation 306). The saturation level of tones in the pixels may be determined based on performing tone mapping and gamma correction operations.

The example process 300 includes identifying image sensor capacitors for discharge when the signal level variance is sufficiently high and the saturation level of tones is sufficiently high (operation 308) and sending a capacitor discharge signal to an image sensor to discharge the identified image sensor capacitors when image sensor capacitors are identified (operation 310).

The apparatus, systems, techniques, and articles provided herein are illustrated in the foregoing examples in connection with a motor vehicle. In other examples and embodiments, the apparatus, systems, techniques, and articles provided may be used with cameras and image sensors in general without a connection to a motor vehicle.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image sensor capacitor discharge system, the system comprising a controller, the controller configured to:

acquire a frame of image data for analysis from one or more imaging devices;

determine a signal level variance amongst pixels in the frame by applying image processing techniques;

determine a saturation level of tones in the pixels by applying image processing techniques;

when the signal level variance is sufficiently high and the saturation level of tones is sufficiently high, identify image sensor capacitors for discharge; and send a capacitor discharge signal to an image sensor to discharge the identified image sensor capacitors;

wherein the identified image sensor capacitors are discharged to avoid image sensor burnout.

2. The system of claim 1, wherein to determine a signal level variance amongst the pixels, the controller is configured to:

segment a received image frame into separate bit planes; and monitor one or more bit planes for bit stability.

3. The system of claim 2, wherein to determine a signal level variance amongst the pixels, the controller is further configured to:

determine a luminance level, noise level, and signal-to-noise ratio for pixels.

4. The system of claim 3, wherein to determine a signal level variance amongst the pixels, the controller is further configured to calculate a standard deviation of signal level variation amongst the pixels based on the bit stability for a bit plane and the luminance level, noise level, and signal-to-noise ratio for pixels.

5. The system of claim 4, wherein to determine a signal level variance amongst the pixels, the controller is further configured to:

assign an index value to each separate bit plane; and apply the index value to match the luminance level, noise level, and signal-to-noise ratio for pixels to output from monitoring one or more bit planes for bit stability when calculating a standard deviation.

6. The system of claim 4, wherein the controller is further configured to determine whether the standard deviation of signal level variation amongst the pixels is non-zero.

7. The system of claim 6, wherein when the standard deviation of signal level variation amongst the pixels is non-zero, the signal level variance is sufficiently high.

8. The system of claim 1, wherein the controller is configured to determine the saturation level of tones in the pixels by performing tone mapping and gamma correction operations.

9. The system of claim 8, wherein the saturation level of tones is sufficiently high when the tones are saturated.

10. A method for discharging image sensor capacitors, the method comprising:

acquiring a frame of image data for analysis from one or more imaging devices;

determining a signal level variance amongst pixels in the frame using image processing techniques;

determining a saturation level of tones in the pixels using image processing techniques;

identifying image sensor capacitors for discharge when the signal level variance is sufficiently high and the saturation level of tones is sufficiently high; and sending a capacitor discharge signal to an image sensor to discharge the identified image sensor capacitors when image sensor capacitors are identified;

wherein the identified image sensor capacitors are discharged to avoid image sensor burnout.

11. The method of claim 10, wherein determining a signal level variance amongst the pixels comprises:

segmenting a received image frame into separate bit planes; and monitoring one or more bit planes for bit stability.

12. The method of claim 11, wherein determining a signal level variance amongst the pixels comprises:

determining a luminance level, noise level, and signal-to-noise ratio for pixels.

13. The method of claim 12, wherein determining a signal level variance amongst the pixels comprises calculating a standard deviation of signal level variation amongst the pixels based on the bit stability for each bit plane and the luminance level, noise level, and signal-to-noise ratio for each pixel.

14. The method of claim 13, wherein determining a signal level variance amongst the pixels comprises:

assigning an index value to each separate bit plane; and matching the luminance level, noise level, and signal-to-noise ratio for pixels to output from monitoring the one or more bit planes for bit stability based on applying the index value when calculating a standard deviation.

15. The method of claim 13, further comprising determining whether the standard deviation of signal level variation amongst the pixels is non-zero.

16. The method of claim 15, wherein when the standard deviation of signal level variation amongst the pixels is non-zero, the signal level variance is sufficiently high.

17. The method of claim 10, comprising determining the saturation level of tones in the pixels based on performing tone mapping and gamma correction operations.

18. The method of claim 17, wherein the saturation level of tones is sufficiently high when the tones are saturated.

19. A vehicle comprising:

one or more imaging devices; and a controller configured to:

acquire a frame of image data for analysis from the one or more imaging devices;

determine a signal level variance amongst pixels in the frame by applying image processing techniques;

determine a saturation level of tones in the pixels by applying image processing techniques;

when the signal level variance is sufficiently high and the saturation level of tones is sufficiently high, identify image sensor capacitors for discharge; and send a capacitor discharge signal to an image sensor to discharge the identified image sensor capacitors;

wherein the identified image sensor capacitors are discharged to avoid image sensor burnout.

20. The vehicle of claim 19, wherein to determine a signal level variance amongst the pixels, the controller is configured to:

segment a received image frame into separate bit planes;

monitor one or more bit planes for bit stability;

determine a luminance level, noise level, and signal-to-noise ratio for pixels; and calculate a standard deviation of signal level variation amongst the pixels based on the bit stability for a bit plane and the luminance level, noise level, and signal-to-noise ratio for pixels.

* * * * *